United States Patent

[11] 3,577,658

[72] Inventors Harold Weinstein
1820 Avenue V, Brooklyn, N.Y. 11229;
Edward Snyder, III, 3323 Fillmore Ave.,
Brooklyn, N.Y. 11234
[21] Appl. No. 849,000
[22] Filed Aug. 11, 1969
[45] Patented May 4, 1971

[54] TEACHING AID
8 Claims, 6 Drawing Figs.
[52] U.S. Cl. .................................................. 35/9R,
35/31A, 35/74
[51] Int. Cl. ..................................................... G09b 7/00
[50] Field of Search ......................................... 35/8, 9, 9
(A), 31 (A), 31 (C), 35 (D), 35 (F), 74

[56] References Cited
UNITED STATES PATENTS
1,587,928  6/1926  Thompson .................... 35/74
2,838,847  6/1958  Zalkind ....................... 35/9

Primary Examiner—William H. Grieb
Attorney—Brufsky, Staas, Breiner and Halsey

ABSTRACT: A teaching machine for use in self-instruction. A programmed card containing a problem and coded answer in the form of punched holes is inserted in the housing of the machine beneath a pair of wheels which are mounted in the housing for independent rotation and axial movement. The answer to the problem is selected by rotating the pair of wheels which have multiple indicia imprinted thereon which are selectively exposed to view during rotation. When the exposed indicia on each wheel are read together, they provide a proposed answer to the problem on the card. The wheels carry electrical contact elements about their circumference, and if the answer selected, as represented by the exposed indicia on each wheel, is correct, the contact elements will be positioned relative to the card so that when the wheels are moved axially towards the card the contact elements will pass through the punched holes to establish an electric circuit. A lamp in the circuit is then actuated to indicate that the correct answer to the problem has been selected. If the lamp is not actuated, then the answer selected is incorrect and the student can select another answer in an attempt to solve the problem.

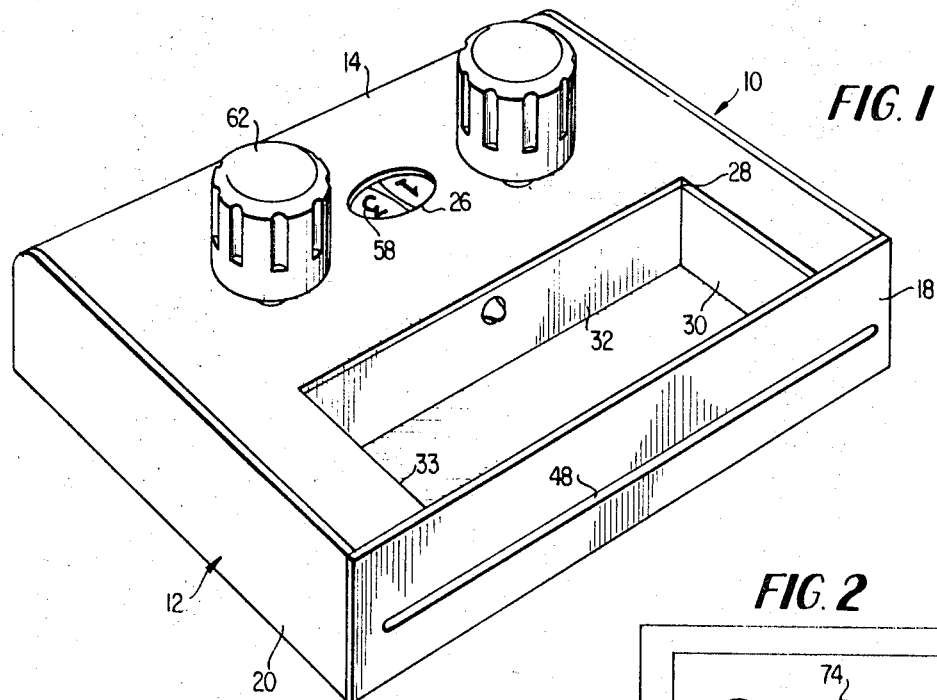
FIG. 1
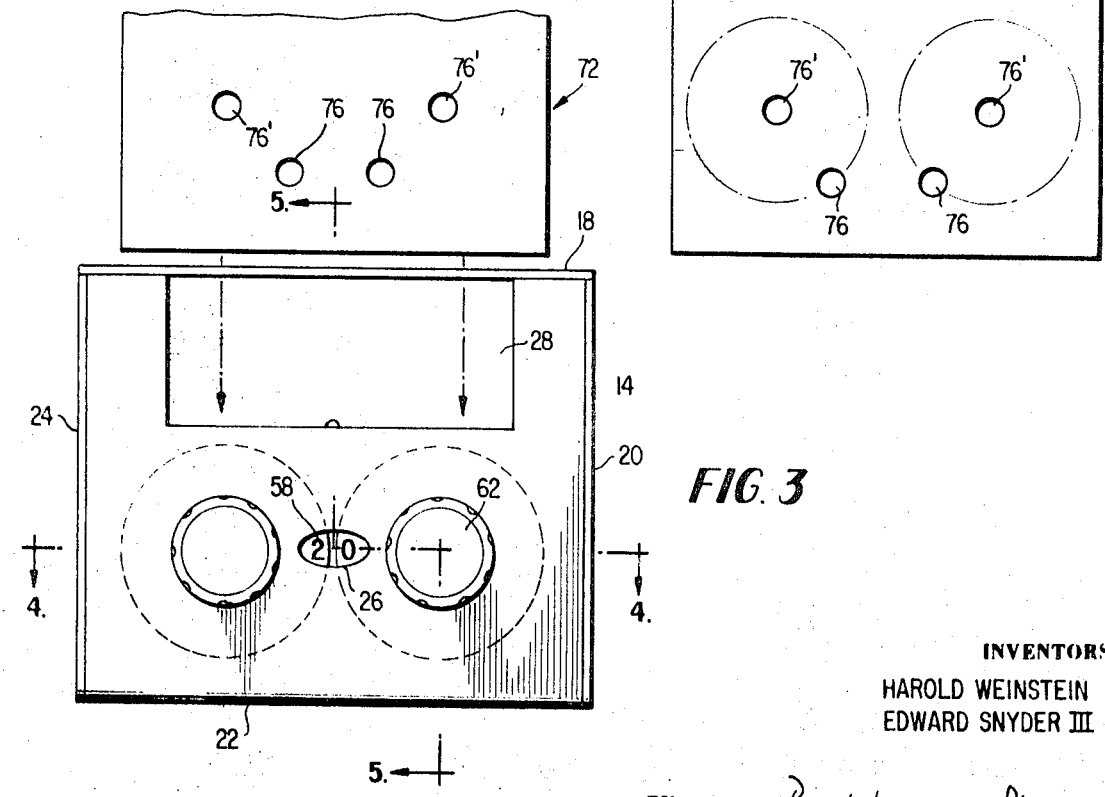
FIG. 2
FIG. 3
INVENTORS
HAROLD WEINSTEIN
EDWARD SNYDER III
BY  *Brufsky and Staas*
ATTORNEYS

PATENTED MAY 4 1971

INVENTORS
HAROLD WEINSTEIN
EDWARD SNYDER III

BY *Brufsky and Staas*

ATTORNEYS 3,577,658

TEACHING AID

BACKGROUND AND SUMMARY OF THE INVENTION

This invention relates generally to the field of educational apparatus and more particularly, to a portable teaching aid for use in teaching children a variety of subjects such as language, history, geography, arithmetic, spelling, reasoning, reading coordination, and the like.

The invention distinguishes from prior art teaching machines in its simplicity of construction.

Briefly, the invention comprises a machine for receiving a programmed card containing a question or problem and a coded answer. The coded answer to the question or problem is in the form of a number of punched holes at preselected locations.

The card is inserted in the machine with the question or problem visible to the student. Mounted within the machine for independent rotation and axial movement are two wheels. Each wheel has a surface bearing multiple indicia which can be used to answer the problem posed on the card. Selective indicia on each wheel are rendered visible. The student can thus select an answer to the problem posed on the card by rotating the wheels so that selected indicia on each wheel when read together present a composite answer to the problem on the card.

Rotation of each wheel positions a pair of electrical contact elements fixed to each wheel, one in the center and the other adjacent the circumference, relative to the punched code on the card. If the relative position of the contact elements on each wheel matches the relative position of the punched holes on the card, axial movement of the wheels towards the card will enable the contact elements to extend through the card and establish an electrical circuit. Suitable means, such as a lamp can be provided in the circuit for indicating that the circuit has been completed and the answer selected is correct.

Should any of the selected indicia be incorrect, the electrical circuit will not be completed, as all of the contact elements cannot pass through the card. The student can then correct his answer by moving a particular wheel or both wheels until visual indication has been obtained that the correct answer has been selected.

BRIEF DESCRIPTION OF THE DRAWINGS

Further objects and advantages of the invention will become apparent from the following description and claims and accompanying drawings wherein:

FIG. 1 is a perspective view of the teaching aid of the present invention;

FIG. 2 is a front view in elevation of a programmed card for use with the machine illustrated in FIG. 1;

FIG. 3 is a front view in elevation illustrating the manner of inserting the card of FIG. 2 in the machine illustrated in FIG. 1;

DETAILED DESCRIPTION OF THE PREFERRED EMBODIMENT

Figure 4:
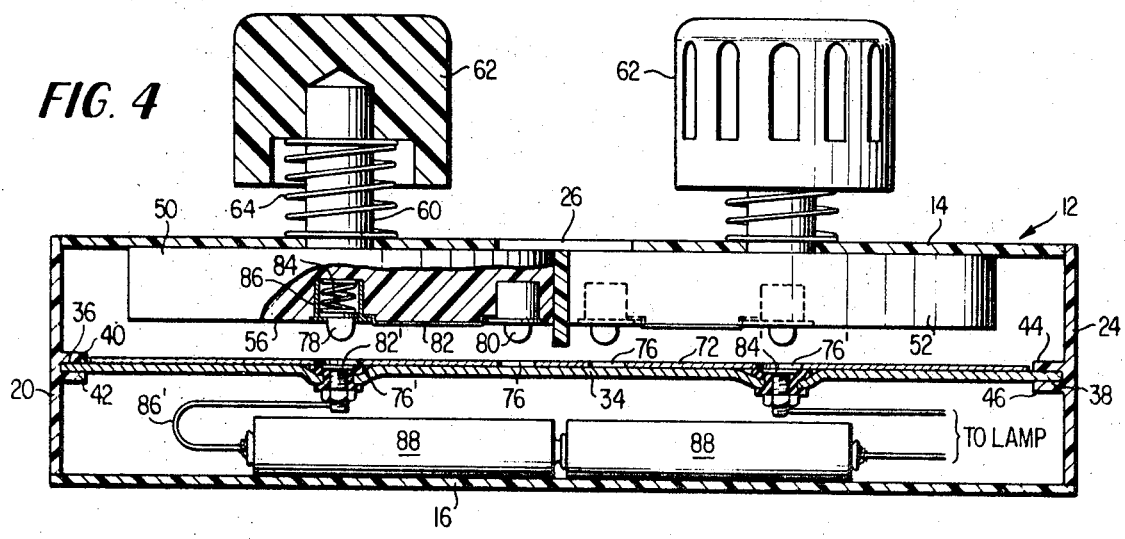
FIG. 4 is a cross-sectional view taken substantially along the plane indicated by line 4—4 of FIG. 3.

Referring now to the drawings in detail, wherein like numerals indicate like elements throughout the several views, the teaching aid comprising the subject of the present invention is generally indicated by the numeral 10.

Teaching aid 10 includes a plastic housing 12 having a generally planar top surface 14 and a generally planar bottom surface 16. Top and bottom surfaces 14 and 16 are connected by a plurality of side surfaces 18, 20, 22 and 24. An oval-shaped opening 26 and a rectangular opening 28 are formed in top surface 14 of housing 12. Cemented, integrally molded or otherwise secured to top surface 14 about the perimeter of opening 28 are walls 30, 32 and 33.

Figure 5:
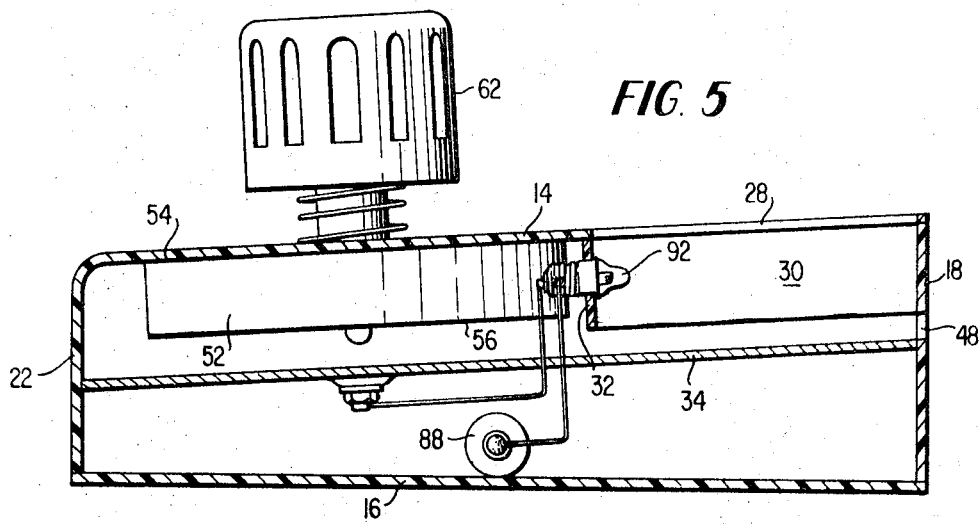
FIG. 5 is a cross-sectional view taken substantially along the plane indicated by line 5—5 of FIG. 3.

A metal plate 34 is mounted within opposed slideways 36 and 38 within the interior of housing 12. Slideways 36 and 38 are formed by spaced lugs 40 and 42 connected to sidewall 20 of housing 12 and projecting inwardly from sidewall 20 at approximately its midpoint. Similarly, slideway 38 is formed by lugs 44 and 46 projecting inwardly from the midpoint of sidewall 24. As shown more clearly in FIG. 5, slideways 36, 38 and metal plate 34 slope downwardly from sidewall 18 towards sidewall 22. Metal plate 34 substantially bisects the interior of housing 12 and is positioned in spaced relation to the lower terminal edges of walls 30, 32, and 33 positioned about the perimeter of recess 28. Entry into the interior of the housing is provided by an elongated slot 48 cut in sidewall 18, which is of a width substantially equal to the space between plate 34 and the lower terminal edges of walls 30, 32, and 33.

Two wheels 50 and 52 are mounted for independent rotation and axial movement within the interior of housing 12 above metal plate 34. Each wheel includes an upper surface 54 beneath top surface 14 of housing 12 and a lower surface 56 spaced from plate 34. Multiple indicia 58 are printed on the upper surface 54 of each wheel. Selective indicia on each wheel is visible through oval-shaped opening 26 in the top surface 14 of housing 12.

A shaft 60 is connected at one end to the center of surface 54 of each wheel and extends upwardly through an opening in surface 14 of housing 12. A knob 62 is press-fitted on the other end of shaft 60. A compressed coil spring 64 surrounds shaft 60 and is held captive between knob 62 and top surface 14 of housing 12. Springs 64 urge wheels 50 and 52 towards surface 14 of housing 12, but upon axial pressure applied to each knob, the wheels can be displaced in an axial direction away from surface 14 towards metal plate 34. Springs 64 automatically return wheels 50 and 52 to a position adjacent to surface 14 upon removal of axial pressure on knobs 62. As clearly shown in FIG. 4, selective rotation of each knob 62 will cause selective and independent rotation of each shaft 60 and its associated wheel beneath surface 14 of housing 12.

Elongated slot 48 in sidewall 18 and the space between plate 34 and wheels 50, 52 as well as the terminal edges of sidewalls 30, 32 and 33 define a longitudinal slot in housing 12 for the reception of a programmed card generally indicated in FIG. 2 by numeral 72. The top portion or programmed card 72 includes indicia 74 posing a problem for teaching instruction. The problem could manifest itself in a variety of subjects as will be readily evident, but for purposes of illustration, the problem posed is the arithmetic problem of one dime plus one dime equals how many cents. Card 72 contains the answer to the problem in code on the lower portion of the card in the form of punched holes 76 and 76'. The relative position of holes 76 and 76' is selected to match the relative position of wheels 50 and 52 if they are rotated by the student to expose the correct answer to the problem through oval-shaped opening 26.

This is accomplished by providing a pair of electrical contact elements 78 and 80, electrically connected by an electrical conductor 82, on the lower surface 56 of each wheel 50, 52. As illustrated more clearly in FIG. 4, each contact element is spring biased outwardly by a coil spring 84 within a metal housing 86 carried by each wheel. Contact element 78 is disposed at the center of each wheel while the contact element 80 is positioned adjacent the wheel circumference.

When each wheel 50, 52 is rotated to expose a different indicia 58 in oval-shaped opening 26, contact 80 on the wheel will be in a different relative angular position with respect to contact 78. Hence, holes 76' in card 72 are punched so that they will always correspond with the center of each wheel 50, 52 or with contact 78, while holes 76 are punched at an angular position with respect to each center hole 76' matching the angular position of contact 80 on each wheel with respect to contact 78 when the correct answer to the problem on card 72 appears in opening 26 selected by independent rotation of wheels 50, 52.

To operate the teaching aid 10, card 72 is slid through slot 48 in sidewall 18 into the interior of housing 12 until it rests against sidewall 22. Card 72 will be supported by metal plate 34 and confined by inwardly projecting lugs 40 and 44 of slideways 36 and 38, respectively. Since plate 34 slopes downwardly, it will facilitate feeding of card 72 into the apparatus. Indicia 74 on card 72 will be visible through recess 28 to the student and will pose the problem to be solved. The coded portion of card 72, containing holes 76 and 76', will be beneath wheels 50 and 52, respectively. The student can then independently rotate each wheel by rotating knob 62 to selectively present indicia which are visible through oval-shaped opening 26 and thus select his answer to the problem. In connection with the problem illustrated on card 72 of FIG. 2, the knobs 62 should be manipulated so that the numeral "2" on the upper surface of wheel 50 is visible through opening 26, while the numeral "0" on the upper surface of wheel 52 is visible, providing a composite answer of "20" to the particular problem illustrated on card 72.

After rotation of wheels 50, 52 to select an answer to the problem, the correctness of the selected answer can be tested by simultaneously depressing both knobs 62 in an axial direction against the urging of coil spring 64, to move wheels 50 and 52 towards card 72. The center contact 78 on each wheel will extend through punched hole 76' on card 72 automatically aligning the card for comparison with the answer selected by the rotation of each wheel by comparing the position of contacts 80 with punched holes 76 on card 72.

Figure 6:
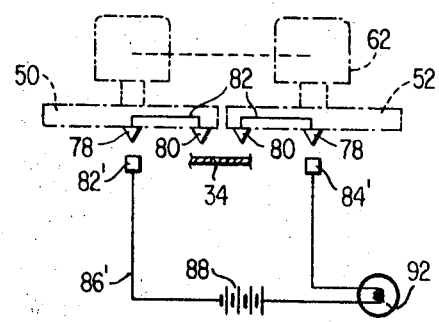
FIG. 6 is a schematic diagram of the electric circuit employed in the teaching aid illustrated in FIG. 1.

Mounted in a depression in plate 34 are spaced electrical contacts 82' and 84'. Contacts 82' and 84' are located directly beneath the contact 78 on each wheel 50 and 52, respectively. An electrical conductor 86 connects contacts 82' and 84' to a source of electrical energy, such as a pair of batteries 88. With particular reference to FIGS. 4 and 6, it will be seen that if the correct answer has been selected by rotation of wheels 50 and 52, depression of wheels 50 and 52 will enable electrical contacts 80 adjacent the circumference of each wheel to pass through punched holes 76' on card 72 to establish an electrical circuit from batteries 88 through electrical connector 86', contact 82', contact 78 (on wheel 50), electrical conductor 82', contact 80 (on wheel 50), metal plate 34, contact 80 (on wheel 52), electrical conductor 82, contact 78 (on wheel 52), contact 84' and back to the batteries 88. If the answer selected is incorrect, then one of the contacts 80 or both will not pass through card 72 to close the electrical circuit. In order to indicate whether a correct answer has or has not been selected, a lamp 92 can be placed in electrical series in the circuit and physically mounted on wall 32. If the circuit is closed, indicating that a correct answer has been selected, lamp 92 will be light.

If lamp 92 does not light, when knobs 62 are depressed, the student can then select another answer and once again test its correctness. The teaching aid 10 therefore enables the student to correct his own answers, thereby increasing its teaching effectiveness.

While the number of component parts in teaching aid 10 are small and uncomplicated, equivalents and modifications of the structure illustrated are also contemplated as being within the scope of the invention. For example, in lieu of program card 72 with hole 76 and 76', an electrically conductive material such as graphite or even foil inserts may be substituted at the hole locations. In lieu of visual indication of a correct answer, an audio signal may be provided. Of course, more complex problems may be posed for solution and different indicia may be printed upon the exposed surfaces of each wheel.

The electrical circuit described can be adapted so that each knob can be depressed to test the correctness of its individual digit, using a common or separate lamp. A means can also be provided on the edge of each wheel to lock a selected indicia in exposed position.

We claim:

1. Teaching apparatus comprising:
   a housing adapted to receive a card-bearing indicia posing a problem to be solved by the user of said apparatus and a coded answer to said problem, said housing having an opening in one surface thereof,
   means within said housing for selecting an answer to the problem posed by the indicia on said card, said selection means including:
   a plurality of wheel means,
   means mounting each of said wheel means for independent rotation and axial movement within said housing adjacent said one surface thereof,
   each of said wheel means having a surface imprinted with multiple indicia thereon which are adapted to be selectively exposed beneath said opening in said housing surface upon rotation of each of said wheel means to provide a composite answer to the problem on said card, and
   means within said housing for testing the correctness of the indicia selected as a composite answer to the problem on said card by comparing in response to simultaneous axial movement of each of said wheel means the relative position of each wheel means to the coded answer on said card.

2. Teaching apparatus comprising:
   a housing adapted to receive a card-bearing indicia posing a problem to be solved by the user of said apparatus and a coded answer to said problem, said housing having an opening in one surface thereof,
   means within said housing for selecting an answer to the problem posed by the indicia on said card, said selection means including:
   a plurality of wheel means, means mounting each of said wheel means for independent rotation and axial movement within said housing adjacent said one surface thereof,
   each of said wheel means having a surface imprinted with multiple indicia thereon which are adapted to be selectively exposed beneath said opening in said housing surface upon rotation of each of said wheel means to provide a composite answer to the problem on said card, and
   means within said housing for testing the correctness of the indicia selected as a composite answer to the problem on said card by comparing in response to axial movement of each of said wheel means the relative position of each wheel means to the coded answer on said card, said testing means including
   a normally open electric circuit means in said housing which is adapted to be closed in response to simultaneous axial movement of each of said wheel means when said wheel means have been rotated to a relative position corresponding to the coded answer on said card.

3. Teaching apparatus in accordance with claim 2 wherein said electric circuit means includes:
   means for indicating that said circuit has been closed and a correct answer to the problem on said card has been selected.

4. Teaching apparatus comprising:
   a housing adapted to receive a card-bearing indicia posing a problem to be solved by the user of said apparatus and a coded answer to said problem, said housing having:
   a first opening in one surface thereof,
   a second opening in said one surface thereof,
   means within said housing for selecting an answer to the problem posed by the indicia on said card, said selection means including:
   a plurality of wheel means,
   means mounting each of said wheel means for independent rotation and axial movement within said housing adjacent said one surface thereof,
   each of said wheel means having a surface imprinted with multiple indicia thereon which are adapted to be selectively exposed beneath said first opening in said housing surface upon rotation of each of said wheel means to provide a composite answer to the problem on said card,
   means defining a slot beneath said wheel means and second opening for receiving said card in said housing so that when said card is fully inserted in said slot the problem portion of said card is visible in said second opening and the coded answer portion is hidden from view beneath said wheel means, and means within said housing for testing the correctness of the indicia selected as a composite answer to the problem on said card by comparing in response to axial movement of each of said wheel means the relative position of each wheel means to the coded answer on said card, said testing means including:

a normally open electric circuit means in said housing which is adapted to be closed in response to simultaneous axial movement of each of said wheel means when said wheel means have been rotated to a relative position corresponding to the coded answer on said card, said electric circuit means including:

an electrically conductive plate mounted within said housing below said slot means adapted to be connected in electrical series with a source of electrical power, and electrical contact means mounted on each of said wheel means for electrically connecting each conductive plate to the power source through said card to establish a closed electrical circuit when said electrical contact means on said wheel means are rotated to a position corresponding to the code on said card and moved simultaneously in an axial direction toward said card.

5. Teaching apparatus in accordance with claim 4 wherein said electrical circuit means further includes:

means for indicating that said circuit has been closed and a correct answer to the problem on said card has been selected.

6. Teaching apparatus in accordance with claim 5 wherein said indication means includes:

a lamp mounted on said housing and connected in electrical series with said conductive plate.

7. Teaching apparatus in accordance with claim 6 wherein said electrical contact means on each of said wheel means includes:

a pair of spaced, electrically connected contact elements extending towards said conductive plate, one of said contact elements being located in the center of said wheel means and the other adjacent its circumference.

8. Teaching apparatus in accordance with claim 7 wherein said means for mounting each of said wheel means within said housing includes:

a shaft connected at one end to said wheel means and extending through said one surface of said housing, a knob fixed to the other end of said shaft, and a compressed coil spring surrounding said shaft between said knob and housing.